United States Patent [19]
Brown

[11] Patent Number: 5,865,246
[45] Date of Patent: Feb. 2, 1999

[54] BALL VALVES

[75] Inventor: Irvine Cardno Brown, Aberdeen, United Kingdom

[73] Assignee: Petroleum Engineering Services Limited, Dyce, United Kingdom

[21] Appl. No.: 659,648

[22] Filed: Jun. 6, 1996

[30] Foreign Application Priority Data

Jun. 5, 1995 [GB] United Kingdom .................... 9511386

[51] Int. Cl.$^6$ ...................................................... E21B 34/06
[52] U.S. Cl. ............................................. 166/95.1; 166/21
[58] Field of Search .................................... 166/324, 321, 166/319, 95.1, 323, 264

[56] References Cited

U.S. PATENT DOCUMENTS

| Re. 27,464 | 8/1972 | Taylor, Jr. . | |
|---|---|---|---|
| 3,411,576 | 11/1968 | Taylor, Jr. . | |
| 3,457,991 | 7/1969 | Sizer et al. . | |
| 3,710,860 | 1/1973 | Holbert, Jr. ............................ | 166/97.1 |
| 3,796,257 | 3/1974 | Hudson . | |
| 3,866,676 | 2/1975 | Burns . | |
| 4,105,075 | 8/1978 | Helmus . | |
| 4,116,272 | 9/1978 | Barrington . | |
| 4,125,165 | 11/1978 | Helmus .................................. | 166/323 |
| 4,197,879 | 4/1980 | Young . | |
| 4,320,804 | 3/1982 | Brooks . | |
| 4,880,060 | 11/1989 | Schwenemann et al. . | |
| 4,934,871 | 6/1990 | Kazokas, Jr. . | |
| 5,050,680 | 9/1991 | Diehl et al. . | |
| 5,535,826 | 7/1996 | Brown et al. . | |

FOREIGN PATENT DOCUMENTS

| 0 055 960 | 7/1982 | European Pat. Off. . |
|---|---|---|
| 869 692 | 6/1961 | United Kingdom . |
| 1 442 563 | 7/1976 | United Kingdom . |
| 1 514 852 | 6/1978 | United Kingdom . |
| 1 574 953 | 9/1980 | United Kingdom . |
| 2 045 317 | 10/1980 | United Kingdom . |
| 2 055 133 | 2/1981 | United Kingdom . |
| 2 097 444 | 11/1982 | United Kingdom . |
| 2 110 741 | 6/1983 | United Kingdom . |
| 2 172 034 | 9/1986 | United Kingdom . |
| 2 192 921 | 1/1988 | United Kingdom . |

*Primary Examiner*—Frank S. Tsay
*Attorney, Agent, or Firm*—Thelen Reid & Priest LLP

[57] ABSTRACT

There is disclosed a ball valve (5) particularly for use in oil/gas wells. Known valves suffer from a number of problems, e.g such as high actuating forces and seat failure due to applied load across the ball being transferred through the seat. The present invention provides a ball valve (5) comprising a body (75) having a cylindrical bore containing a ball (10) and means for rotably mounting the ball (10) within the body (75) about a fixed axis, further comprising actuation means (15, 40, 45, 50) for controlling rotation of the ball (10), wherein in use to cause the ball (10) to rotate the actuation means (15, 40, 45, 50) is caused to move along a direction substantially parallel to an axis of the bore of the body (75).

31 Claims, 4 Drawing Sheets

BALL VALVES

1. Field of the Invention

This invention relates to ball valves, and in particular, though not exclusively, to ball valves used in oil/gas wells for the recovery of subterranean oil and gas reserves.

2. Description of the Related Art

Ball valves are used throughout the oil and gas industry, primarily to control the flow of fluid within pipes, and derive their name from the use of a spherical gate, hereafter referred to as a ball, to open and close the valve port. Existing ball valves suffer from a number of drawbacks, especially with regard to their use in space restrictive applications and their use between zones of differing pressure, eg to isolate sections of a tubing conduit.

When ball valves are closed and the ball subjected to differential pressure, the resulting forces created must be transmitted from the ball into the supporting structure. These forces, which are proportional to the retained differential pressure, are transmitted through normal forces between contacting surfaces of the ball and other components. These co-operating surfaces must slide relative to one another in order for the ball to move from closed to open position. Frictional forces opposing this motion result from and are proportional to the described normal forces and differential pressure. For any specific valve design, the required actuating force to move the ball increases as a result of differential pressure. High actuation forces are troublesome especially in space restrictive applications where the activation force available may be severely constrained. To overcome this problem, various methods have been used to reduce or eliminate the normal forces by reducing or eliminating the differential pressure during actuation or alternatively to reduce the magnitude of the frictional forces independently of the normal forces. Reducing the differential pressure by applying pressure to the low pressure side of the valve in order to reduce frictional forces is not desirable in that a both fluid media and a method of creating the applied pressure must be supplied which may involve great expense. Also, one may not have knowledge of the pressure required to eliminate the differential pressure. Valve designs which seek to automatically reduce the differential pressure at the time of actuation "self equalising valves" do so by creating an opening to permit fluid to flow from the high pressure to low pressure side. Self equalising valves suffer from being generally more complex and more prone to failure than valves without this feature. It is not always practical to implement self equalising valve designs as the upstream and downstream fluid reservoirs may react in a manner to cause a differential pressure to be sustained long after the creation of the equalising opening. For these and other reasons, non self equalising valve designs are preferred in many applications. Reducing the frictional forces by presenting a bearing material at the ball to support interface can be effective. Ball valve designs in which the sealing surface of the ball is also the surface which transmits the normal forces "seat supported valves" do not lend themselves to effective friction reduction nor to the transmission of high normal loads due to the conflicting nature of requirements for sealing at this surface. Ball valve designs in which the normal load bearing surfaces are presented along the fixed rotation axis of the ball in conjunction with a journal arrangement are desirable in that effective bearings are most easily incorporated in this position.

Ball valves of slender construction which can be inserted within a confined radial area are advantageous in many applications such as for use within a subterranean well bore or a well head tree structure. Further, remote applications such as valves connected or inserted within the production tubing within a subterranean well bore or within a well head tree structure cannot be accessed directly to manipulate the ball from one position to another.

SUMMARY OF THE INVENTION

It is an object of the present invention to obviate or mitigate at least some of the aforementioned disadvantages.

According to a first aspect of the present invention there is provided a ball valve comprising a body having a cylindrical bore containing a ball and means for rotably mounting the ball within the body about a fixed axis, further comprising actuation means for controlling rotation of the ball, wherein, in use, to cause the ball to rotate the actuation means is caused to move along a direction substantially parallel to an axis of the bore of the body.

Such rotation of the ball from a first/second position to a second/first position causes the valve to open/close.

The ball valve according to the present invention seeks to provide an advantage over the prior art that any differential load existing within the body across the ball is transferred to the body rather than a seat of the ball. Further any load applied to the ball by the actuation means is likewise transferred to the body.

The fixed axis may be substantially perpendicular to the axis of the bore of the body.

Preferably the ball provides at least one journal which extends along an axis of rotation of the ball and which locates in a bearing provided within the cylindrical body.

Preferably the ball provides a pair of opposing journals which extend co-axially along an axis of rotation of the ball and which locate in respective bearings provided within the cylindrical body.

Preferably also the bearings are both provided on a common transverse plane through a longitudinal axis of said cylindrical body.

In such case the ball may be said to be "trunnion mounted".

The actuation means may be housed within the cylindrical body.

The actuation means may provide at least one actuation arm.

The at least one actuation arm may have an aperture formed therethrough capable of receiving a journal extending from the ball.

The at least one actuation arm may carry a pin capable of being received by a keyway formed in the ball.

There may be provided a bearing housing(s), the/each bearing housing having a bearing formed therein capable of receiving the/one of the journal(s).

The/each bearing housing may be retained within a respective recess formed in an inner wall of the body such that the/each bearing housing is retained in longitudinal relation to the body.

According to a second aspect of the present invention there is provided a downhole tool including a ball valve, the ball valve comprising a body having a cylindrical bore containing a ball and means for rotably mounting the ball within the body about a fixed axis, further comprising actuation means for controlling rotation of the ball, wherein, in use, to cause the ball to rotate the actuation means is caused to move along a direction substantially parallel to an axis of the bore of the body.

According to a third aspect of the present invention there is provided a well-head structure (Christmas tree) including a ball valve, the ball valve comprising a body having a cylindrical bore containing a ball and means for rotably mounting the ball within the body about a fixed axis, further comprising actuation means for controlling rotation of the ball, wherein, in use, to cause the ball to rotate the actuation means is caused to move along a direction substantially parallel to an axis of the bore of the body.

The Christmas tree may be provided on a geophysical surface and installed at a well-head to control the flow of produce thereat, the Christmas tree providing a valve assembly comprising one or more ball valves, wherein there is further provided a well-head tube which is at least partially located below the surface, at least one of the one or more valves being retained within the well-head tube below the surface.

The geophysical surface may be the sea-bed.

A tubing hanger may be provided at or near an inwardly extending end of the well-head tube.

An outwardly extending end of the well-head tube may be located above the geophysical surface.

The at least one valve may be controlled by hydraulic pressure.

An outermost end of the valve assembly may be connectable to a further assembly which may comprise a "y" or "t" spool, flow valve, choke and control module.

According to a fourth aspect of the present invention there is provided a ball valve comprising a body having a cylindrical bore containing a ball, wherein the ball provides at least one journal which extends along an axis of rotation of said ball and which locates in a bearing provided within the cylindrical body.

Preferably the ball provides a pair of opposing journals which extend co-axially along an axis of rotation of the ball and which locate in respective bearings provided within the cylindrical body.

Preferably also the bearings are both provided on a common transverse plane through a longitudinal axis of the cylindrical body.

According to a fifth aspect of the present invention there is provided a downhole tool including a ball valve, the ball valve comprising a body having a cylindrical bore containing a ball, wherein the ball provides at least one journal which extends along an axis of rotation of said ball and which locates in a bearing provided within the cylindrical body.

According to a sixth aspect of the present invention there is provided a well-head structure including a ball valve, the ball valve comprising a body having a cylindrical bore containing a ball, wherein the ball provides at least one journal which extends along an axis of rotation of said ball and which locates in a bearing provided within the cylindrical body.

BRIEF DESCRIPTION OF THE DRAWINGS

An embodiment of the present invention will now be described, by way of example only, with reference to the following diagrams which are.

DESCRIPTION OF THE PREFERRED EMBODIMENTS

Figure 1:
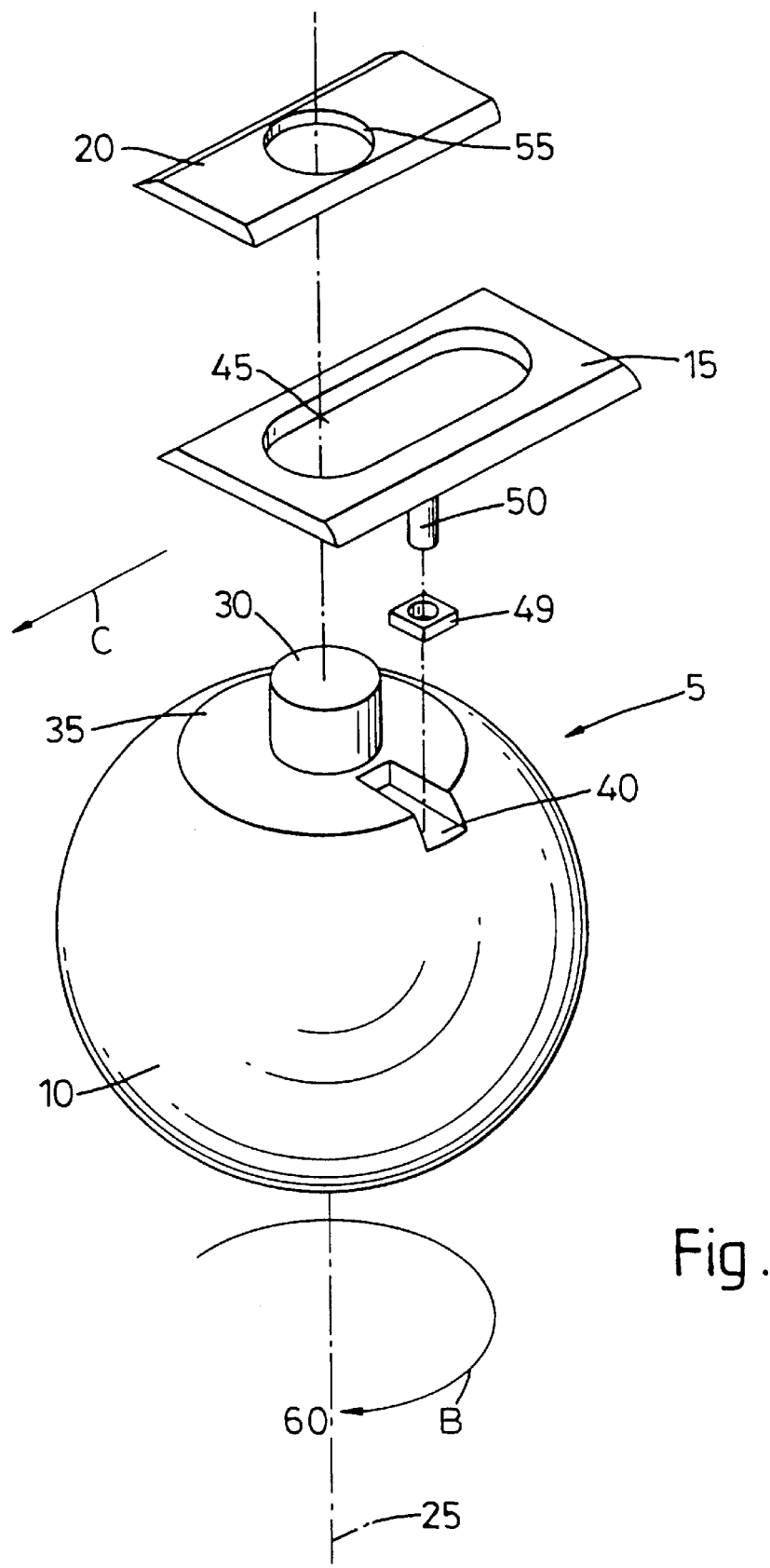
FIG. 1 a schematic exploded perspective view of a ball, actuation mechanism and bearing housing for use in a ball valve according to an embodiment of the present invention.
Figure 3:
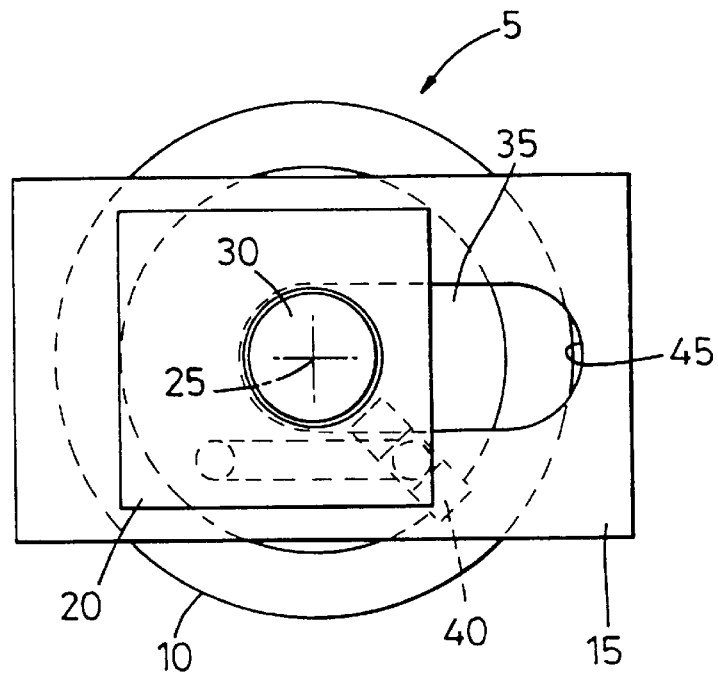
FIG. 3 a view along the direction of arrow A of the ball, actuation mechanism and bearing housing of FIG. 2.

Referring firstly to FIG. 1, there is shown a ball valve 5 in accordance with an embodiment of the present invention. The ball valve 5 comprises a ball 10, an actuation arm 15 and a bearing housing 20. For the sake of simplicity FIG. 1 shows only one side of the ball 10 and its associated components. It should, however, be understood that the features described hereafter are duplicated on the opposing side of the ball 10. The ball 10 serves to act as a spherical gate within a valve body (not shown), and is provided with a communication passage 70 (FIG. 3). The communication passage 70 allows fluid to pass through the ball 10 when the valve 5 is in an open position.

Opposing sides of the ball 10, along an intended axis of rotation 25, are formed such that cylindrical journals 30 extend from opposing planar surfaces 35. The planar surfaces 35 are disposed substantially perpendicular to the intended axis of rotation 25 of the ball 10. Radially extending keyways 40 are provided within each planar surface 35 to facilitate the rotation of the ball 10.

Actuation arms 15 are provided with slots 45 with a width greater than the diameter of the cylindrical journals 30, thus enabling the journals 30 to extend through the arms 15. The arms 15 are further provided with drive pins 50, eccentrically mounted in respect of the ball axis of rotation 25, through bearings 49 which engage in the keyways 40. The actuation arms 15 are surmounted by bearing housings 20 which in turn are mounted within the valve body (not shown). The housings 20 each incorporate a cylindrical bearing surface 55 which works in conjunction with the cylindrical journals 30 to seek to allow the ball 10 to rotate in a relatively friction free manner. Hence a low opening torque is required to rotate the ball 10.

Rotation of the ball 10, shown by arrow B on FIG. 1, is achieved by linear movement, indicated by arrow "C" on FIG. 1, of the actuation arms 15 perpendicular to the ball axis of rotation 25. The movement of the arms 15 may be achieved by hydraulic pressure and/or the use of a spring, or by the employment of any other suitable means. Linear movement of the arms 15 is converted into rotational motion 60 by the pin 50 and keyway 40 arrangement between the arms 15 and the ball 10.

Figure 2:
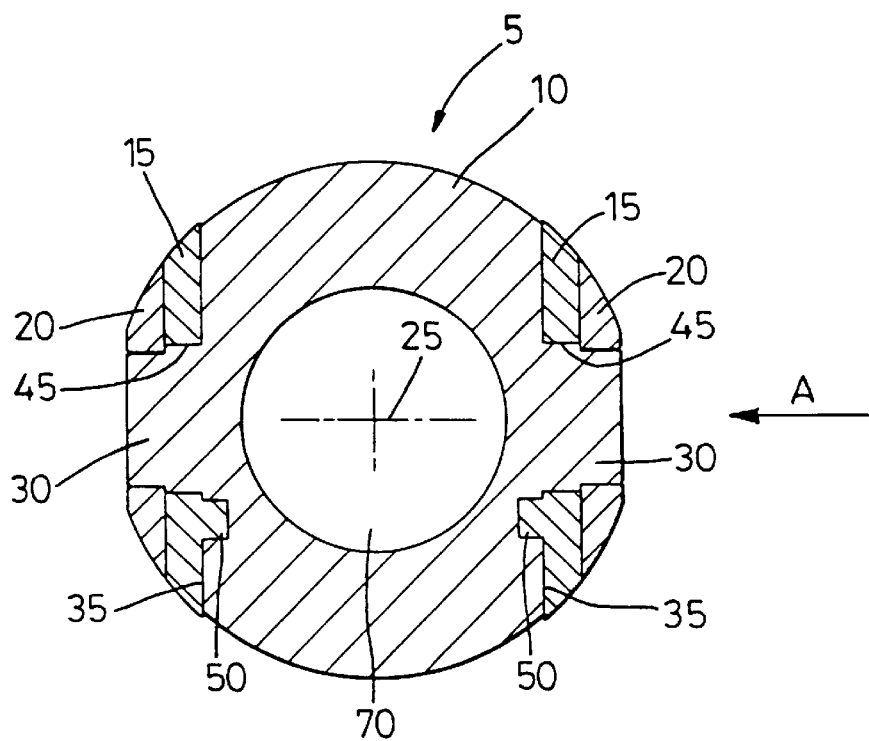
FIG. 2 a cross-sectional view from the top of the ball, actuation mechanism and bearing housing of FIG. 1.

FIGS. 2 and 3 show alternative views of the valve described substantially hereinbefore. FIG. 2 shows that the actuation arms 15 and bearing housings 20 are replicated on either side of the ball 10. Furthermore, FIG. 2 shows the communication passage 70 needed to allow fluid to flow through the ball 10 when the valve 5 is in an open position.

Figure 4:
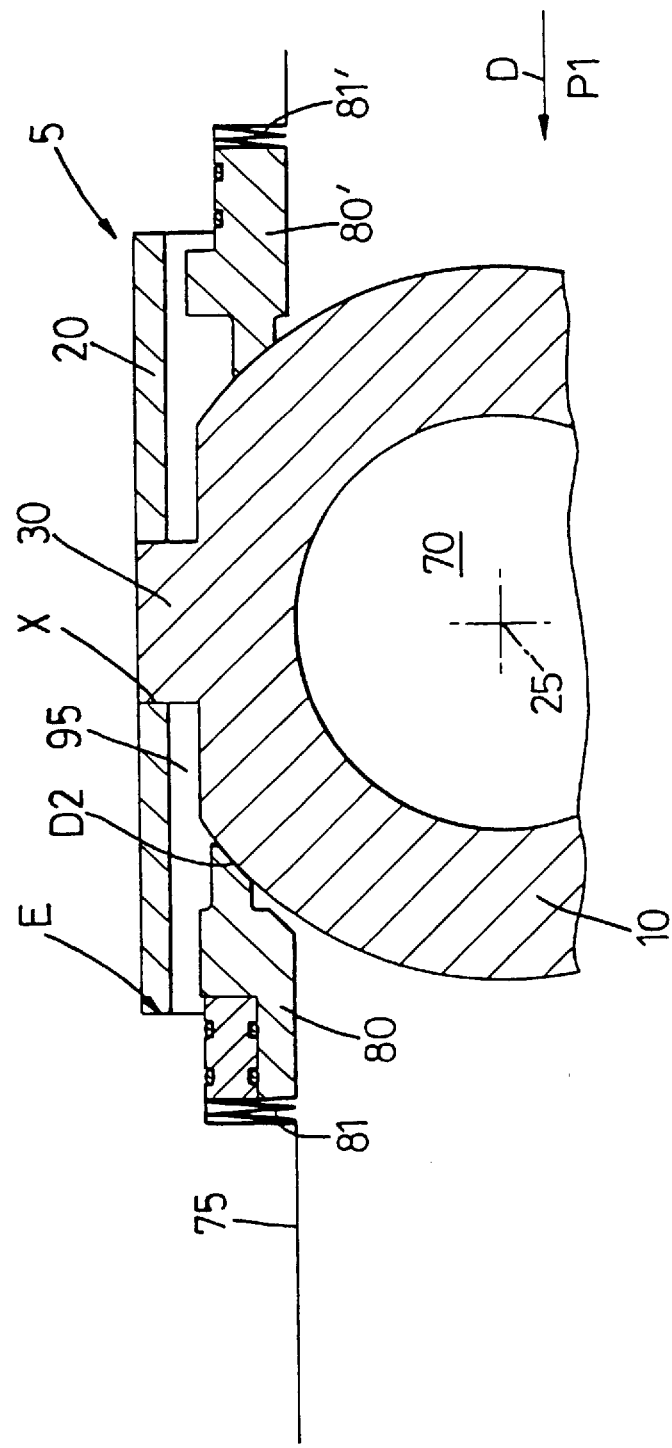
FIG. 4 a schematic partial longitudinal cross-sectional view of the ball valve of FIG. 1.

Referring now to FIG. 4 there is shown a ball 10 and bearing housing 20 installed within a valve body (pressure housing) 75. Valve seats 80, 80' are provided on either side of the ball 10.

Suitable positioning of the bearing housing(s) 20 within the valve body 75 allows any loading experienced by the ball 10, (e.g. due to a differential pressure being held across the ball 10 when the valve is in a closed position) to be transferred to the valve body 75. A load applied to the ball 10 in the direction of arrow "D" on FIG. 4 is transferred by the cylindrical journals 30 to the bearing housings 20. In turn the bearing housings 20 transfer the load to the valve body 75 at the point indicated by arrow "E" on FIG. 4. This configuration of bearing housing 20 and valve body 75 allows forces applied to either side of the ball 10 to be transferred to the valve body 75.

An added advantage of this bearing housing 20/valve body 75 configuration is that even under a heavy load being applied to the ball 10, the valve seats 80, 80' remain only lightly loaded. This further contributes to the low opening torque required by the valve 5, and also results in reduced valve seat wear and an increase in overall valve reliability. The valve seats 80, 80' are double acting so that if the integrity of a primary seal in one direction is compromised, the other seat will be energised as a back-up. FIG. 4 also clearly shows a space 95 between the ball 10 and the bearing housing 20 where the actuation arm 15 (not shown) is installed. This further demonstrates the compact nature of any valve according to the present invention.

The ball 10 and sealing seat 80, 80' are assembled in such a way that, in use, any loading of the ball 10 due to a pressure differential being applied across the sealed ball 10 and seat 80, 80' is not supported by the seat 80, 80', but is supported by the two bearings, diametrically opposite, positioned at the central rotational axis of the ball 10. The bearings in turn transfer that applied load directly into the surrounding housing 75 or via trunnion plates 20 into the housing. In other words the ball 10 for all intents and purposes cannot move towards the seat 80, 80', but the seat 80, 80' can, however, move towards the ball 10, since the seat 80, 80' is normally spring loaded by a spring 81, 81', plus there is a slight differential area at the seat 80, 80' on which pressure below the closed ball 10 will help to maintain a seal between the ball 10 and seat 80, 80'.

Referring again to FIG. 4, if a load P1 is applied to the ball 10, in direction "D", the ball 10 cannot move due to support at "X". D2 forms a sealing point ball 10 to seat 80. D1 can be varied to minimise differential area acting down.

From a practical point of view, say P1=5000 PSI, and D2=4.000 inches, the sealed area seeing pressure up equals $$\frac{\pi D_2^2}{4^2} \times P1 = \frac{\pi 4^2}{4} \times 5000 = 62,831 \text{ lbs}$$

This is taken (or supported at X) and does not load the seat 80.

If D1=3.875 then P1 will be pushing down on the ball 10 by $(D_2^2-D_1^2) \times \pi/4 \times 5000$ PSI=3,865 lbs By reducing the differential area between $D_1$ and $D_2$ this load can be controlled. If the journal at "X" was removed then obviously all loading would be carried completely on the seat 80, the journal at "X" being a properly designed bearing can rotate relatively freely. This is not the case if the ball 10 is loaded the seat directly.

Figure 5:
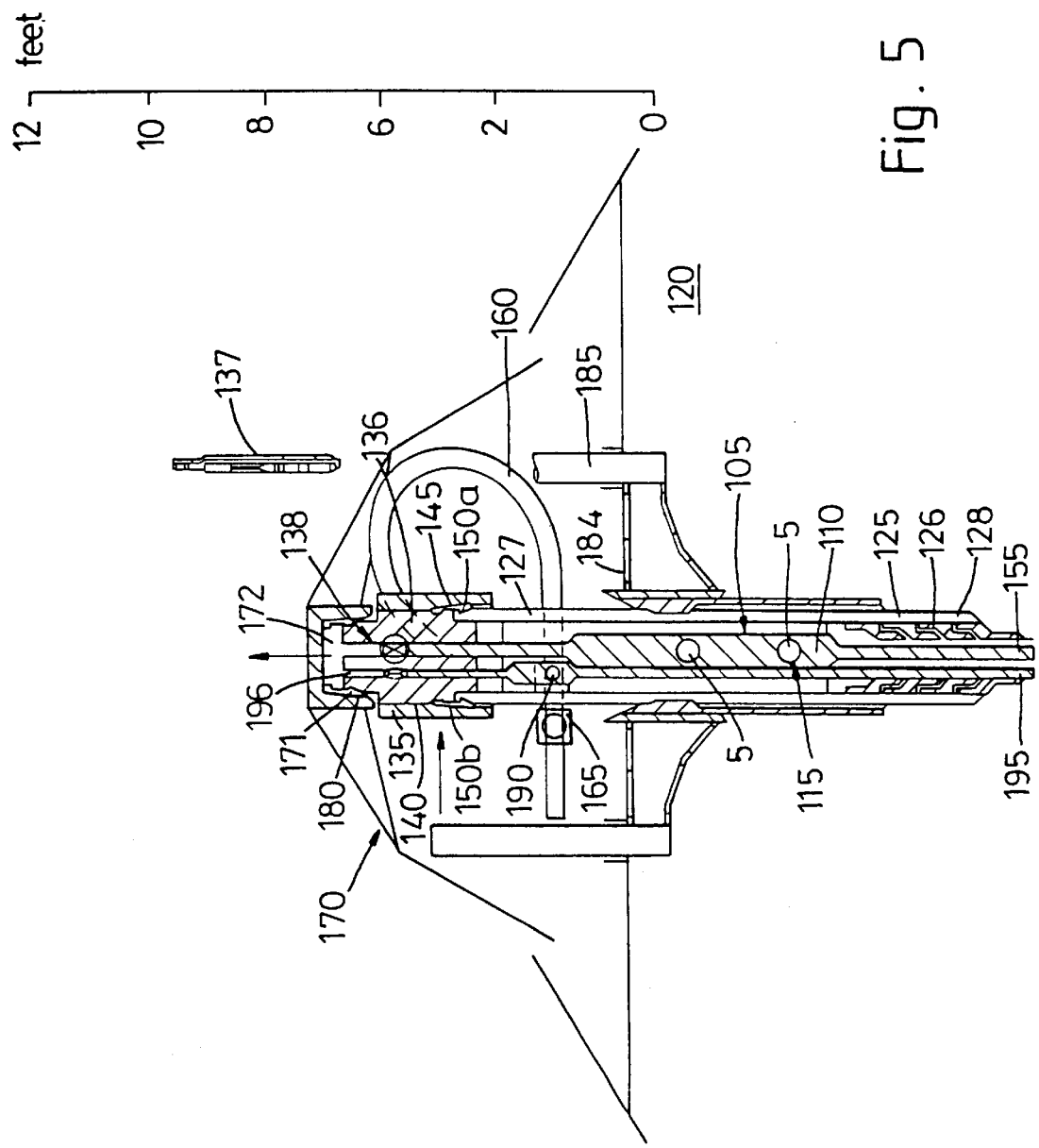
FIG. 5 a schematic side view of an embodiment of a sub-sea Christmas tree according to the present invention.

Referring to FIG. 5, there is shown an embodiment of a well-head structure (Christmas tree), generally designed 105, according to the present invention located substantially at sea-bed level. The Christmas tree 105 disclosed herein is similar to that disclosed by the present Applicant in GB 2 267 920 B. However, the Christmas tree 105 of the present invention employs at least one ball valve 5 as hereinbefore described.

The Christmas tree 105 comprises a valve assembly 110 providing a plurality of valves located below the level of the sea-bed 120. One or more of the valves are ball valves 5 as hereinbefore described.

The valve assembly 110 is located within a well-head (or conductor) tube 125 having a first, upper end 127 which extends above the surface of the sea-bed 120 outwardly from a conductor borehole (not shown), and a second, lower end 128 which extends inwardly of the conductor borehole. The well-head tube 125 is itself contained within a conductor guidebase 124.

At the lower end 128 of the well-head tube 125 there is provided a tubing hanger 126 as is known in the art. A pack-off may be positioned at the upper end or lower end of the well-head tube 125. The upper end 127 of the well-head tube 125 has a recess 150a spaced therearound. This recess 150a is capable of receiving an inner surface of each of a corresponding plurality of collet fingers 145 provided on an upper package 136. Further, an outer surface of each of the plurality of collet fingers 145 are capable of being received within corresponding recesses 150b in an inner surface of an aperture 140 of a mechanical connector 135.

In this way, the well-head tube 125, upper package 136 and mechanical connector 135 may be retained together.

The upper package 136 consists of a flow spool or similar flow wing valve, flow wing valve, choke, and control module. This package 136 directs the flow and the control of the trees 105 to a platform above.

An upper end of the valve assembly 110 is contained within the upper package 136, and a metal-to-metal sealing wireline plug 137, or similar, may be run into a first upper bore 138 in a top surface of the upper package to seal the bore 138.

Within the well-head tube 125 and tubing hanger 126 there is provided a conduit 155 for containment of the main production flow, the lower end of the conduit 155 extending into the production borehole in the sea-bed 120, while the upper end of the conduit 155 is connected to the lower end of the valve assembly 110 within the well-head tube 125.

Extending from an outlet of the upper assembly 136 there is a flow loop 160 which is suitably shaped to withstand cyclic stresses. A choke 165 is provided in the flow loop 160, the choke serving to control the velocity of a fluid therethrough.

At an upper end of the upper assembly 136 there is provided a debris cover 170 which is supported by the upper assembly 136 and a safety frame located therearound (not shown). The cover 170 is connectable to the upper end of the upper assembly 136 via collet fingers 171 provided on an inner surface of an aperture 172 in the cover 170, the collet figures 171 being receivable in a corresponding recess 180 in an outer surface of the upper end of the upper assembly 136. This cover also acts as a secondary metal-to-metal seal against the environment.

Spaced substantially equidistant around the tree 105 and connected to the conductor 124 via a guidebase 184 are a plurality of guide rods 185, the upper ends of which are engageable with lower ends of an equal number of mating rods (not shown) retained in association with a further assembly.

A further assembly (not shown) may be a supplementary Christmas tree provided for safety reasons in the event of failure of the tree 105. The further assembly may be supported by a semi-submersible rig or floating platform.

A further valve 190 is provided within the tube 125, a lower end of this valve 190 being connected to a further conduit 195 extending into the borehole through the well-head tube 125 and tubing hanger 126, while an upper end of the valve 190 is connected to the upper assembly 136 communicating with a bore 196. The further valve 190 is preferably also a ball valve. The function of the further valve 190 and conduit 195 is to act as an annulus pressure control valve, as is known in the art.

The embodiment of the invention described hereinbefore is given by way of example only, and is not intended to limit the scope of the invention in any way.

It should be appreciated that the disclosed invention provides a particularly simple and easily constructed solution to problems experienced in this art, and in particular to problems experienced within the realm of seat supported ball valves.

It should also be understood that although the disclosed embodiment of Christmas tree employing the ball valve is particularly for sub-sea use, the ball valve may be employed in sub-sea or land-based Christmas trees.

We claim:

1. A ball valve comprising:
   a body having a cylindrical bore;
   at least one bearing provided in the body;
   a ball contained in the bore, the ball having a fixed axis of rotation and providing at least one journal extending along the axis of rotation of the ball and being located in a respective bearing, for rotatably mounting the ball within the body about the fixed axis; and
   actuation means for controlling rotation of the ball, said actuation means in use being movable along a direction substantially parallel to an axis of the bore of the body to cause the ball to rotate.

2. The ball valve claimed in claim 1, wherein the fixed axis is substantially perpendicular to the axis of the bore of the body.

3. The ball valve claimed in claim 2, wherein the actuation means are housed within the body.

4. The ball valve claimed in claim 1, wherein the ball provides a pair of opposing journals which extend co-axially along an axis of rotation of the ball the which locate in respective bearings provided within the body.

5. The ball valve claimed in claim 4, wherein the bearings are both provided on a common transverse plane through the axis of the bore of the body.

6. The ball valve claimed in claim 4, wherein there are provided a pair of bearing housings, each of the pair of bearings being formed in one of the pair of bearing housings.

7. The ball valve claimed in claim 6, wherein there are provided a pair of recesses formed in an inner wall of the body, and wherein, each of the pair of bearing housings is retained in a respective recess such that each bearing housing is retained in longitudinal relation to the body.

8. The ball valve claimed in claim 1, wherein the actuation means are housed within the body.

9. The ball valve claimed in claim 8, wherein the actuation means provides at least one actuation arm.

10. The ball valve claimed in claim 9, wherein the at least one actuation arm carries a pin capable of being received by a keyway formed in the ball.

11. The ball valve claimed in claim 1, wherein the actuation means are housed within the body.

12. The ball valve claimed in claim 1, wherein there is provided at least one bearing housing, the at least one bearing being formed in a respective bearing housing.

13. The ball valve claimed in claim 12, wherein there is provided at least one recess formed in an inner wall of the body, and wherein the at least one bearing housing is retained in a respective recess such that the at least one bearing housing is retained in longitudinal relation to the body.

14. A ball valve comprising:
    a body having a cylindrical bore;
    first and second bearings provided on a common transverse plane through an axis of the bore of the body;
    a ball contained in the bore, the ball providing opposing first and second journals which extend co-axially along a fixed axis of rotation of the ball and which locate respectively in the first and second bearings, for rotatably mounting the ball within the body about the fixed axis; and
    actuation means for controlling rotation of the ball, said actuation means in use being movable along a direction substantially parallel to the axis of the bore of the body to cause the ball to rotate, the actuation means being housed within the body and providing at least one actuation arm, the at least one actuation arm having an aperture formed therethrough capable of receiving a journal extending from the ball.

15. The ball valve claimed in claim 14, wherein the at least one actuation arm carries a pin capable of being received by a keyway formed in the ball.

16. A downhole tool including at least one ball valve, the at least one ball valve comprising:
    a body having a cylindrical bore;
    at least one bearing provided in the body;
    a ball contained in the bore, the ball having a fixed axis of rotation and providing at least one journal extending along the fixed axis of rotation of the ball and being located in a respective bearing, for rotatably mounting the ball within the body about the fixed axis; and
    actuation means for controlling rotation of the ball, said actuation means in use being movable along a direction substantially parallel to an axis of the bore of the body to cause the ball to rotate.

17. A Christmas tree including at least one ball valve, the at least one ball valve comprising:
    a body having a cylindrical bore;
    at least one bearing provided in the body;
    a ball contained in the bore, the ball having a fixed axis of rotation and providing at least one journal extending along the fixed axis of rotation of the ball and being located in a respective bearing, for rotatably mounting the ball within the body about the fixed axis of rotation; and
    actuation means for controlling rotation of the ball, said actuation means in use being movable along a direction substantially parallel to an axis of the bore of the body to cause the ball to rotate.

18. A well-head comprising:
    (a) a well-head tube at least partially located below the surface;
    (b) a Christmas tree provided on a geophysical surface and installed at the well-head to control the flow of produce thereat, the Christmas tree including a valve assembly comprising a plurality of valves, at least one of the valves being retained within the well-head tube below the surface, and at least one of the valves comprising a ball valve including:
       (1) a body having a cylindrical bore;
       (2) at least one bearing provided in the body;
       (3) a ball contained in the bore, the ball having a fixed axis of rotation and providing at least one journal extending along the fixed axis of rotation of the ball and being located in a respective bearing, for rotatably mounting the ball within the body about the fixed axis; and (4) actuation means for controlling rotation of the ball, said actuation means in use being movable along a direction substantially parallel to an axis of the bore of the body to cause the ball to rotate.

19. The well-head claimed in claim 18, wherein the geophysical surface is the sea-bed.

20. The well-head claimed in claim 19, wherein a tubing hanger is provided at or near an inwardly extending end of the well-head tube.

21. The well-head claimed in claim 19, wherein an outwardly extending end of the well-head tube is located above the geophysical surface.

22. The well-head claimed in claim 18, wherein a tubing hanger is provided at or near an inwardly extending end of the well-head tube.

23. The well-head claimed claim 22, wherein an outwardly extending end of the well-head tube is located above the geophysical surface.

24. The well-head claimed in claim 18, wherein an outwardly extending end of the well-head tube is located above the geophysical surface.

25. The well-head claimed in claim 18, wherein at least one of said one or more valves is controlled by hydraulic pressure.

26. A well-head comprising:

(a) a well-head tube at least partially located below the surface;

(b) a Christmas tree provided on a geophysical surface and installed at the well-head to control the flow of produce thereat, the Christmas tree including a valve assembly comprising a plurality of valves, at least one of the valves being retained within the well-head tube below the surface, and at least one of the valves comprising a ball valve including:

(1) a body having a cylindrical bore;
(2) at least one bearing provided in the body;
(3) a ball contained in the bore, the ball having a fixed axis of rotation;
(4) means for rotatably mounting the ball within the body about the fixed axis; and
(5) actuation means for controlling rotation of the ball, said actuation means in use being movable along a direction substantially parallel to an axis of the bore of the body to cause the ball to rotate; and (c) a further assembly comprising a "y" or "t" spool, flow valve, choke and control module, and wherein the further assembly is connectable to an outermost end of the valve assembly.

27. A downhole tool including a ball valve, the ball valve comprising:

a body having a cylindrical bore;

at least one bearing provided within the body;

a ball contained in the bore, the ball having a fixed axis of rotation and providing at least one journal extending along the axis of rotation of the ball and being located in a respective bearing, for rotatable mounting the ball within the body about the fixed axis; and actuation means for controlling rotation of the ball, said actuation means in use being movable along a direction substantially parallel to an axis of the bore of the body to cause the ball to rotate.

28. The ball valve claimed in claim 27, wherein the ball provides a pair of opposing journals which extend co-axially along an axis of rotation of the ball and which locate in respective bearings provided within the body.

29. The ball valve claimed in claim 28, wherein the bearings are provided on a common transverse plane through a longitudinal axis of the body.

30. A well-head structure including a ball valve, the ball valve comprising:

a body having a cylindrical bore;

at least one bearing provided within the body;

a ball contained in the bore, the ball having a fixed axis of rotation and providing at least one journal extending along the axis of rotation of the ball and being located in a respective bearing, for rotatably mounting the ball within the body about the fixed axis; and actuation means for controlling rotation of the ball, said actuation means in use being movable along a direction substantially parallel to an axis of the bore of the body to cause the ball to rotate.

31. A ball valve comprising:

a body having a cylindrical bore;

first and second bearings provided on a common transverse plane through an axis of the bore of the body;

a ball contained in the bore, and the ball providing opposing first and second journals which extend co-axially along a fixed axis of rotation of the ball and which locate in respectively in the first and second bearings, for rotatably mounting the ball within the body about the fixed axis which is substantially perpendicular to the axis of the bore; and actuation means for controlling rotation of the ball, said actuation means in use being movable along a direction substantially parallel to the axis of the bore of the body to cause the ball to rotate, the actuation means being housed within the body and providing at least one actuation arm, the at least one actuation arm having an aperture formed therethrough capable of receiving a journal extending from the ball.

* * * * *